(12) United States Patent
Park et al.

(10) Patent No.: US 12,314,613 B2
(45) Date of Patent: May 27, 2025

(54) METHOD AND SYSTEM FOR SOLID STATE DRIVE (SSD)-BASED REDUNDANT ARRAY OF INDEPENDENT DISKS (RAID)

(71) Applicant: Samsung Electronics Co., Ltd., Gyeonggi-do (KR)

(72) Inventors: Heekwon Park, San Jose, CA (US); Tong Zhang, Mountain View, CA (US); Rekha Pitchumani, Oak Hill, VA (US); Yang Seok Ki, Palo Alto, CA (US)

(73) Assignee: Samsung Electronics Co., Ltd (KR)

( * ) Notice: Subject to any disclaimer, the term of this patent is extended or adjusted under 35 U.S.C. 154(b) by 30 days.

(21) Appl. No.: 17/885,756

(22) Filed: Aug. 11, 2022

(65) Prior Publication Data

US 2023/0409245 A1  Dec. 21, 2023

Related U.S. Application Data

(60) Provisional application No. 63/354,062, filed on Jun. 21, 2022.

(51) Int. Cl.
*G06F 12/00* (2006.01)
*G06F 3/06* (2006.01)
*G06F 12/1009* (2016.01)

(52) U.S. Cl.
CPC .......... *G06F 3/0688* (2013.01); *G06F 3/0604* (2013.01); *G06F 3/064* (2013.01); *G06F 3/065* (2013.01); *G06F 12/1009* (2013.01); *G06F 2212/206* (2013.01); *G06F 2212/7201* (2013.01)

(58) Field of Classification Search
CPC ...... G06F 3/0688; G06F 3/0604; G06F 3/064; G06F 3/065; G06F 12/1009; G06F 2212/206; G06F 2212/657; G06F 2212/7201
See application file for complete search history.

(56) References Cited

U.S. PATENT DOCUMENTS

| 6,675,176 B1 * | 1/2004 | Shinkai .................. G06F 16/10 707/823 |
| 6,795,895 B2 | 9/2004 | Merkey et al. |
| 7,353,324 B2 | 4/2008 | Tanaka |
| 9,128,662 B2 | 9/2015 | Kim et al. |

(Continued)

FOREIGN PATENT DOCUMENTS

WO    WO 2020/052321    3/2020

OTHER PUBLICATIONS

European Search Report dated Nov. 9, 2023 issued in counterpart application No. 23173283.5-1224, 9 pages.

(Continued)

*Primary Examiner* — John A Lane
(74) *Attorney, Agent, or Firm* — The Farrell Law Firm, P.C.

(57) ABSTRACT

A method and redundant array of independent disks (RAID) system are provided. An operation is received from an application at a file system (FS) of the RAID system. A memory mapping module of the RAID system receives at least an FS logical block address (LBA) in accordance with the operation. The memory mapping module creates a mapping from a virtual memory of the application to a RAID array in a system memory of the RAID system using at least the FS LBA.

20 Claims, 7 Drawing Sheets

(56) References Cited

U.S. PATENT DOCUMENTS

| | | | |
|---|---|---|---|
| 9,213,633 B2 | 12/2015 | Canepa et al. | |
| 9,495,241 B2 | 11/2016 | Flynn et al. | |
| 9,652,343 B2 | 5/2017 | Klughart | |
| 9,652,376 B2 | 5/2017 | Kuzmin et al. | |
| 9,946,642 B2 | 4/2018 | Tomlin et al. | |
| 9,990,304 B2 | 6/2018 | Tomlin et al. | |
| 10,073,621 B1* | 9/2018 | Foley | G06F 11/1076 |
| 10,296,451 B1 | 5/2019 | Schneider et al. | |
| 10,884,850 B2 | 1/2021 | Jeyapaul et al. | |
| 2003/0084397 A1* | 5/2003 | Peleg | G06F 11/1076 |
| | | | 714/E11.034 |
| 2006/0206661 A1* | 9/2006 | Gaither | G06F 12/0815 |
| | | | 711/E12.024 |
| 2010/0199036 A1* | 8/2010 | Siewert | G06F 12/122 |
| | | | 711/E12.001 |
| 2011/0246716 A1* | 10/2011 | Frame | G06F 3/061 |
| | | | 711/E12.001 |
| 2012/0096217 A1* | 4/2012 | Son | G06F 12/0246 |
| | | | 711/E12.008 |
| 2012/0226853 A1* | 9/2012 | Bert | G06F 3/0619 |
| | | | 711/E12.019 |
| 2013/0019057 A1* | 1/2013 | Stephens | G06F 3/0688 |
| | | | 711/E12.008 |
| 2014/0359347 A1* | 12/2014 | Fuxa | G06F 11/1096 |
| | | | 714/6.22 |
| 2015/0010143 A1 | 1/2015 | Yang | |
| 2016/0103778 A1 | 4/2016 | Lesarte et al. | |
| 2019/0102250 A1* | 4/2019 | O'Krafka | G06F 11/1068 |
| 2019/0258415 A1 | 8/2019 | Imamura | |
| 2020/0371692 A1 | 11/2020 | Van Doorn et al. | |
| 2021/0240616 A1 | 8/2021 | Stabrawa et al. | |
| 2021/0278998 A1 | 9/2021 | Li | |
| 2021/0334201 A1 | 10/2021 | Bennett et al. | |
| 2022/0121563 A1* | 4/2022 | Kamran | G06F 3/0688 |

OTHER PUBLICATIONS

EP Communication Report dated Mar. 27, 2025 issued in counterpart application No. 23173283.5-1218, 10 pages.

* cited by examiner

METHOD AND SYSTEM FOR SOLID STATE DRIVE (SSD)-BASED REDUNDANT ARRAY OF INDEPENDENT DISKS (RAID)

PRIORITY

This application is based on and claims priority under 35 U.S.C. § 119(e) to U.S. Provisional Patent Application Ser. No. 63/354,062, filed on Jun. 21, 2022, the entire contents of which are incorporated herein by reference.

TECHNICAL AREA

The present disclosure relates generally to solid state drives (SSDs), and more particularly, to a compute express link (CXL) SSD-based redundant array of independent disks (RAID) system.

BACKGROUND

Big data applications handle extremely large datasets. SSDs are widely used as a hardware feature in cloud infrastructure for big data services. SSDs are well suited for big data applications because they provide fast storage performance, and are efficient and cost-effective. Specifically, input/output (I/O) intensive operations are accelerated by using an SSD architecture. An SSD-based RAID system protects data by distributing redundant data blocks across multiple SSDs. Mirroring is a concept in RAID in which data is written simultaneously to two separate drives. Striping is a concept in RAID in which data is split evenly across two or more drives.

SUMMARY

Embodiments enable software RAID in systems equipped with multiple CXL SSDs. Applications may access data transparently using a memory operation without considering a RAID configuration.

According to an embodiment, a method of a RAID system is provided. An operation may be received from an application at a file system (FS) of the RAID system. A memory mapping module of the RAID system may receive at least an FS logical block address (LBA) from the FS, in accordance with the operation. The memory mapping module may create a mapping from a virtual memory of the application to a RAID array in a system memory of the RAID system using at least the FS LBA.

According to an embodiment, a RAID system is provided that may include an FS configured to receive an operation from an application. The RAID system may also include a memory mapping module configured to receive at least an FS LBA from the FS in accordance with the operation, and may create a mapping from a virtual memory of the application to a RAID array in a system memory of the RAID system using at least the FS LBA.

According to an embodiment, a memory mapping module of a RAID system is provided that may include a memory and a controller. The controller may be configured to receive at least an FS LBA from an FS of the RAID system in accordance with an operation received at the FS. The controller may also be configured to create a mapping from a virtual memory of the application to a RAID array in a system memory of the RAID system using at least the FS LBA. The RAID array includes SSDs with a cache-coherent protocol.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device, according to one embodiment, may be one of various types of electronic devices utilizing storage devices. The electronic device may use any suitable storage standard, such as, for example, peripheral component interconnect express (PCIe), nonvolatile memory express (NVMe), NVMe-over-fabric (NVMeoF), advanced extensible interface (AXI), ultra path interconnect (UPI), ethernet, transmission control protocol/Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), and/or the like, or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL.cache, Gen-Z, coherent accelerator processor interface (CAPI), cache coherent interconnect for accelerators (CCIX), and/or the like, or any combination thereof. Any of the memory devices may be implemented with one or more of any type of memory device interface including double data rate (DDR), DDR2, DDR3, DDR4, DDR5, low-power DDR (LPDDRX), open memory interface (OMI), NVlink high bandwidth memory (HBM), HBM2, HBM3, and/or the like. The electronic devices may include, for example, a portable communication device (e.g., a smart phone), a computer, a portable multimedia device, a portable medical device, a camera, a wearable device, or a home appliance. However, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC), a co-processor, or field programmable gate arrays (FPGAs).

RAID modules have been designed for traditional block devices. However, traditional RAID modules do not accommodate a CXL SSD. CXL is a cache-coherent interconnect and/or protocol for processors, memory expansion, and accelerators, which maintains memory coherency between a CPU memory space and a memory on attached devices. A CXL SSD can provide data via I/O operations as well as memory operations.

Embodiments of this disclosure enable software RAID in systems that are equipped with multiple CXL SSDs. Additionally, applications are able access data transparently using a memory operation without considering the RAID configuration.

Figure 1:
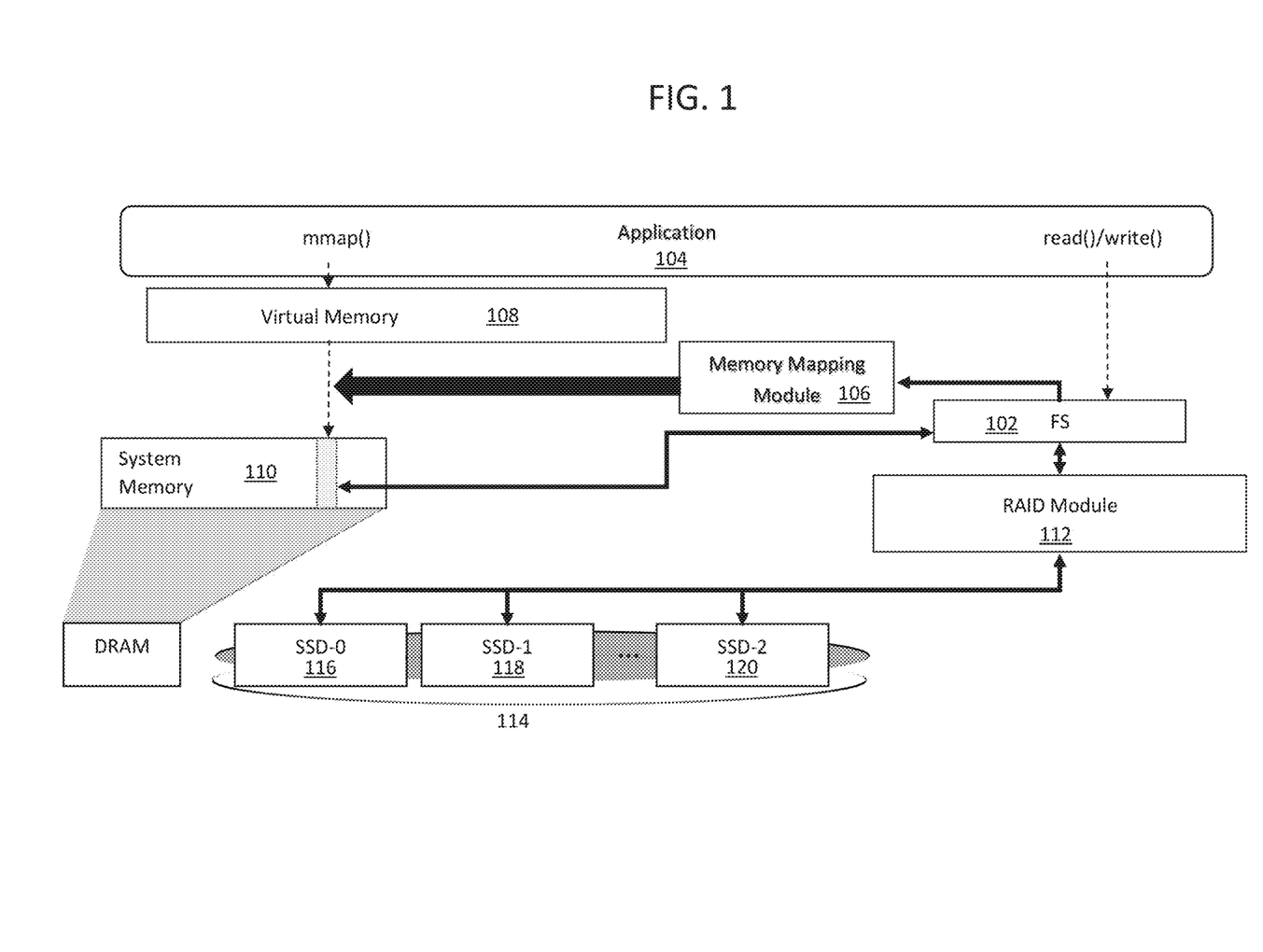
FIG. 1 is a diagram illustrating an SSD-based RAID system, according to an embodiment.

FIG. 1 is a diagram illustrating an SSD-based RAID system with a RAID array. An FS 102 may receive a R/W operation from an application 104, and a virtual-to-physical (V2P) memory mapping module 106 may obtain an FS LBA relating to the R/W operation from the FS 102. Using the FS LBA, the V2P memory mapping module 106 may map a virtual memory 108 of the application 104 to a system memory 110 (e.g., dynamic random access memory (DRAM)).

A RAID module 112 may convert the FS LBA to a device identifier (ID) and a device LBA. The device ID may be the ID of one of the SSDs in a RAID array 114. The SSDs in the RAID array 114 may include, but are not limited to, SSD-0 116, SSD-1 118, and SSD-2 120. The RAID module 112 may provide data striping and data replication for every R/W operation to one or more of the SSDs in the RAID array 114, via an NVMe over peripheral component interconnect express (PCIe). The FS 102 may use the device ID and the device LBA to read data, via direct memory access (DMA), from a corresponding SSD of the RAID array 114 into the page cache of the system memory 110, mapped by the V2P memory mapping module 106.

Figure 2:
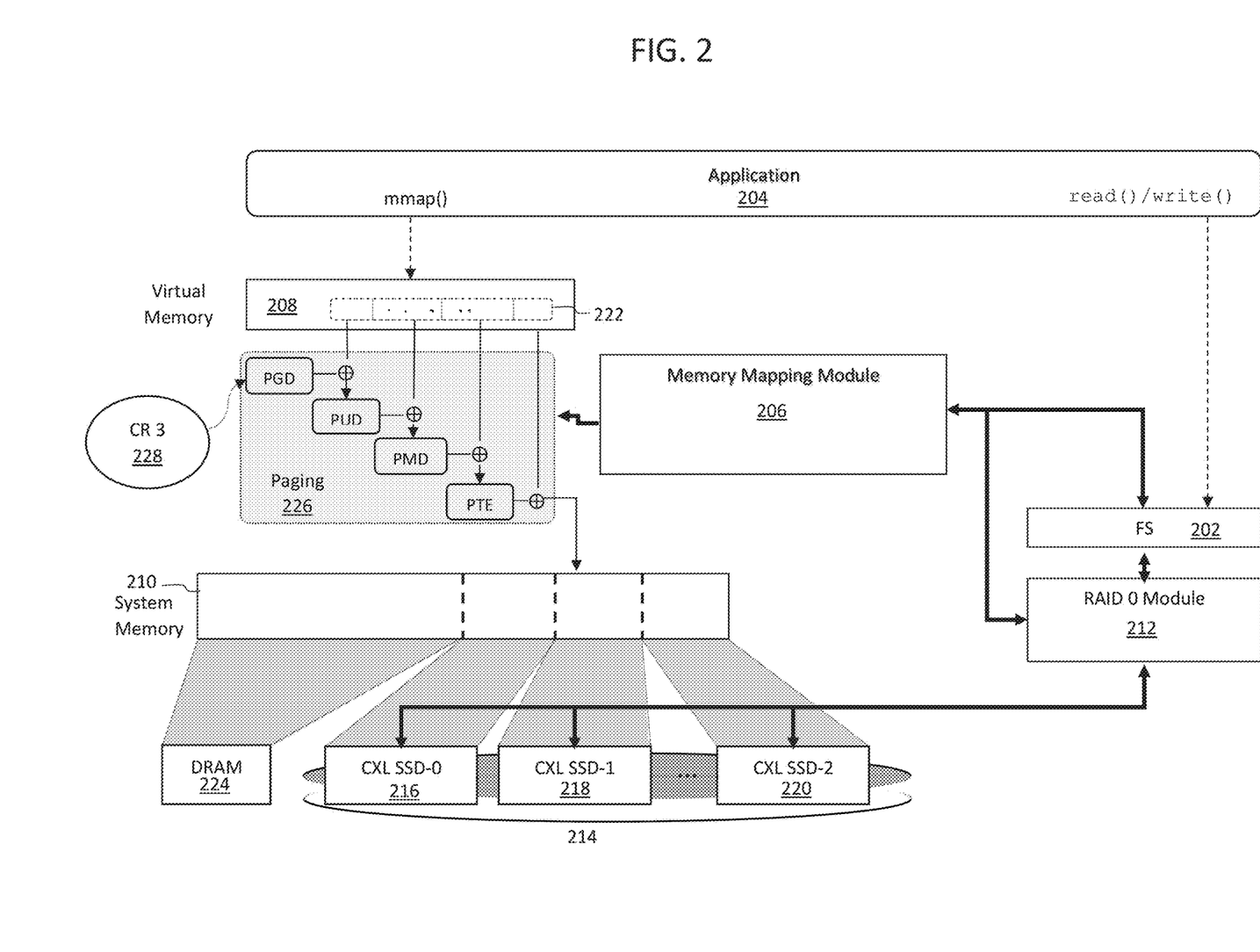
FIG. 2 is a diagram illustrating a CXL SSD-based RAID system, according to an embodiment.

FIG. 2 is a diagram illustrating a CXL SSD-based RAID system with a RAID 0 array, according to an embodiment. RAID 0 is a standard RAID level that involves simple striping. An FS 202 may receive a R/W operation from an application 204, and a V2P memory mapping module 206 may obtain an FS LBA relating to the R/W operation from the FS 202. A RAID 0 module 212 may convert the FS LBA into a CXL SSD ID and an LBA in the CXL SSD using RAID information. The CXL SSD ID may be the ID of one of the CXL SSDs in a RAID 0 array 214. The CXL SSDs in the RAID 0 array 214 may include, but are not limited to, CXL SSD-0 216, CXL SSD-1 218, and CXL SSD-2 220. The CXL SSD ID and the LBA in the CXL SSD may be provided to the V2P memory mapping module 206.

The V2P memory mapping module 206 may create a direct mapping from a virtual memory 208 to a system memory 210 based on the FS LBA from the FS 202 and the CXL SSD ID and the LBA in the CXL SSD from the RAID 0 module 212. Specifically, the V2P memory mapping module 206 may obtain a base address of the CXL SSD, and convert the LBA to an offset in the memory. The V2P memory mapping module 206 may determine a physical address in the system memory 210 by adding the offset to the base address. Thus, the V2P memory mapping module 206 may create a mapping between a virtual memory 208 (e.g., a user virtual address 222) of the application 204 and the system memory 210, which includes a DRAM 224 and the RAID 0 array 214 of CXL SSDs (e.g., device memory or CXL memory). Specifically, the V2P memory mapping module 206 may calculate a physical address to which the CXL SSD is exposed.

In mapping the virtual memory 208 and the system memory 210, a paging module 226 may map a page global directory (PGD), a page upper directory (PUD), a page middle directory (PMD), and a page table entry directory (PTE) through a control register (CR) 228 (e.g., CR3). The CR 228 may enable translation of addresses by locating the page directory and page tables for a current operation.

In CXL SSD-based RAID systems with RAID arrays at levels RAID 1 and above, the V2P memory mapping module may select a device for mapping between a mirror storage device and a sub-mirror storage device. The selection policy that is used may include, for example, round-robin, random, fixed, or storage device with fewest mappings (which would evenly distribute a system load). A data replication manager (DRM) may support a serial mode and a parallel mode. Data integrity may be checked in the memory mapping module.

Figure 3:
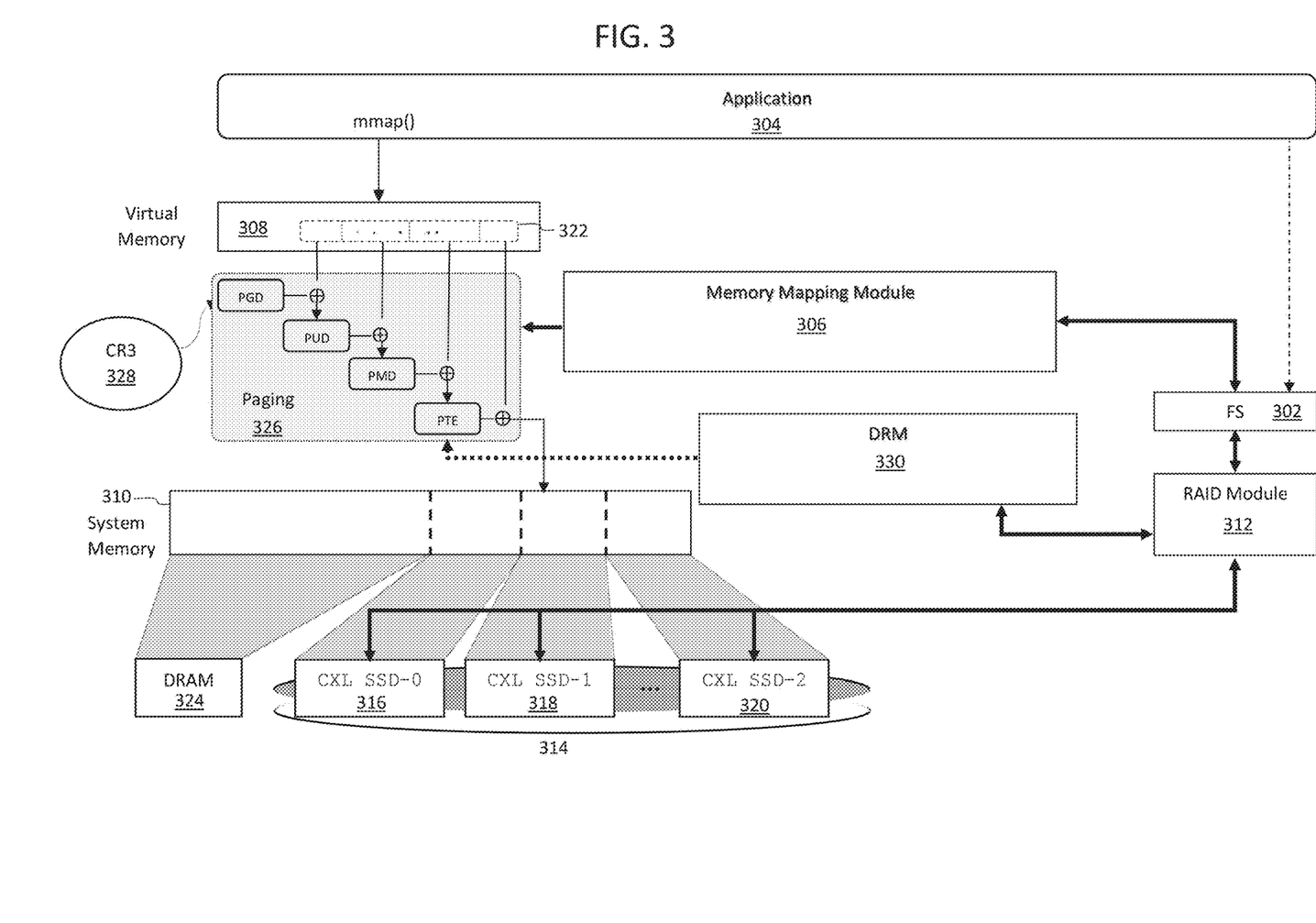
FIG. 3 is a diagram illustrating a CXL SSD-based RAID system with a RAID 0 array, according to an embodiment.

FIG. 3 is a diagram illustrating a CXL SSD-based RAID system with a RAID array in a serial mode, according to an embodiment. The RAID array may be any standard RAID level above RAID 0 (e.g., RAID 1-6). For example, the RAID array may be a RAID 1 array, which involves simple or multi-mirroring. In the serial mode, data may be replicated after updating data in one of the CXL SSDs.

An FS 302 may receive a R/W operation from an application 304, and a V2P memory mapping module 306 may obtain an FS LBA relating to the R/W operation from the FS 302. The V2P memory mapping module 306 may convert the FS LBA to an absolute physical address in a system memory 310. A base address can be either a mirror storage device or a sub-mirror storage device. Data integrity may be checked through memory comparison. The V2P memory mapping module 306 may create a direct mapping between a virtual memory 308 (e.g., a user virtual address 322) of the application and a system memory 310, which includes a DRAM 324 and a RAID array 314 of CXL SSDs (e.g., device memory or CXL memory). CXL SSDs in the RAID array 314 of the system memory 310 may include, but are not limited to, CXL SSD-0 316, CXL SSD-1 318, and CXL SSD-2 320.

In mapping the virtual memory 308 to the system memory 310, a paging module 326 may map a PGD, a PUD, a PMD, and a PTE to the system memory 310 through a control register (CR) 328 (e.g., CR3). The CR 328 may enable translation of addresses by locating the page directory and page tables for a current operation.

A DRM 330 may periodically check if a CXL page is dirty due to an update. Specifically, when the application 304 writes data, the CPU may set the dirty bit in the PTE by hardware logic. The DRM 330 may check all PTEs that point to a mirror storage device or a sub-mirror storage device. If a page is dirty, the page ID may be recorded and then the dirty bit may be cleared in order to avoid frequent updates to a sub-mirror storage device. The DRM 330 is in communication with a RAID module 312, and writes data via the RAID module 312 if detected data is dirty. The DRM 330 also checks whether recorded pages remain clean. If clean, the data may be replicated into the sub-mirror CXL SSD. If dirty, the dirty bit may be cleared. The DRM 330 may perform replication via a CXL.io protocol or a CXL.mem protocol. The DRM 330 may copy data from mirror to sub-mirror storage devices or vice versa. The replication policy may be one of memory-to-memory replication, memory-to-block replication, block-to-block replication (R/W data via CXL.io), or device-to-device direct copy, for example.

Figure 4:
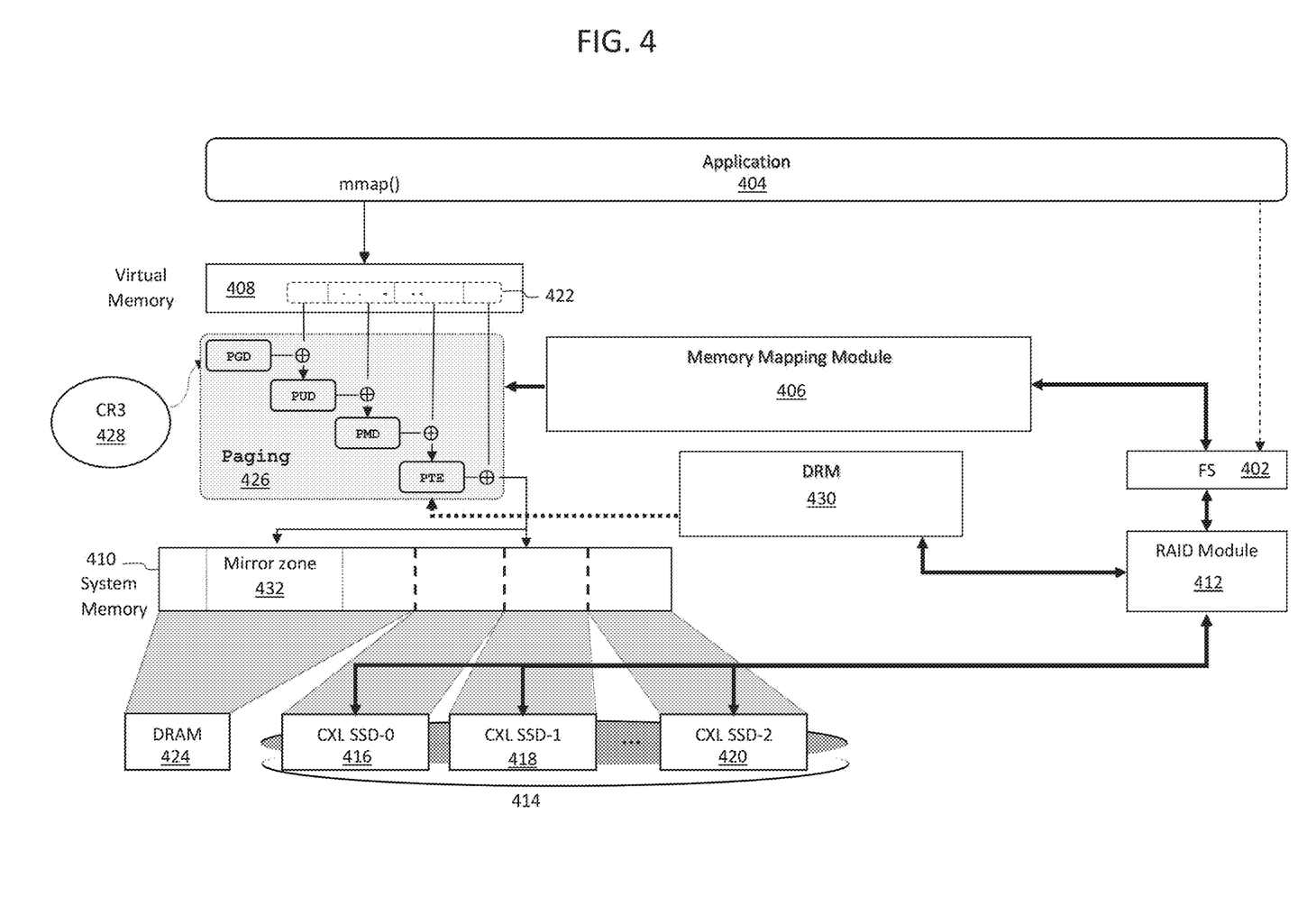
FIG. 4 is a diagram illustrating a CXL SSD-based RAID system with a RAID array in a parallel mode, according to an embodiment.

FIG. 4 is a diagram illustrating a CXL SSD-based RAID system with a RAID array in a parallel mode, according to an embodiment. The RAID array may be any standard RAID level above RAID 0 (e.g., RAID 1-6). For example, the RAID array may be a RAID 1 array, which involves simple or multi-mirroring. In the parallel mode, a write to a reserved CXL RAID mirror zone is simultaneously replicated and dispatched to CXL SSDs that make up the RAID 1 configuration.

An FS 402 may receive a R/W operation from an application 404, and a V2P memory mapping module 406 may obtain an FS LBA relating to the R/W operation from the FS 402. The V2P memory mapping module 406 may convert the FS LBA to an absolute physical address in a system memory 410. A base address can be either a mirror storage device or a sub-mirror storage device. Data integrity may be checked through memory comparison. The V2P memory mapping module 406 may create a direct mapping between a virtual memory 408 (e.g., a user virtual address 422) of the application 404 and the system memory 410, which includes a DRAM 424 and a RAID array 414 (e.g., device memory or CXL memory). CXL SSDs in the RAID array 414 of the system memory 410 may include, but are not limited to, CXL SSD-0 416, CXL SSD-1 418, and CXL SSD-2 420.

In mapping the virtual memory 408 to the system memory 410, a paging module 426 may map a PGD, a PUD, a PMD, and a PTE to the system memory 410 through a control register (CR) 428 (e.g., CR3). The CR 428 may enable translation of addresses by locating the page directory and page tables for a current operation.

Write protection may be set for a CXL page when the V2P memory mapping module 406 creates a mapping between the virtual memory 408 and the system memory 410. Specifically, write protection may be set so that if the application 404 tries to write to the RAID array 414 (e.g., CXL memory), the data will first be written into a CXL RAID mirror zone 432 secured in the DRAM 424. Thus, for every write operation, data may be first written to the CXL RAID mirror zone 432. After completing a page update (write) in the CXL RAID mirror zone 332, the page may be simultaneously replicated and dispatched to CXL SSDs that make up the RAID configuration. CXL.io protocol may be used for data copying.

A DRM 430 may check if the CXL RAID mirror zone 432 has a valid page. If a valid page is dirty, the DRM may write back to the mirror and sub-mirror storage devices simultaneously. The DRM 430 is in communication with a RAID module 412, and may write data via the RAID module 412 if detected data is dirty. The DRM 430 may clear the dirty bit after write-back. If a page is clean, the PTEs pointing to the page may be changed to map to the CLX memory directly, and the page is write protected.

Accordingly, embodiments of the disclosure result in flexible data placement and mapping algorithms, efficient data mapping to meet different performance requirements, and improved garbage collection efficiency.

Figure 5:
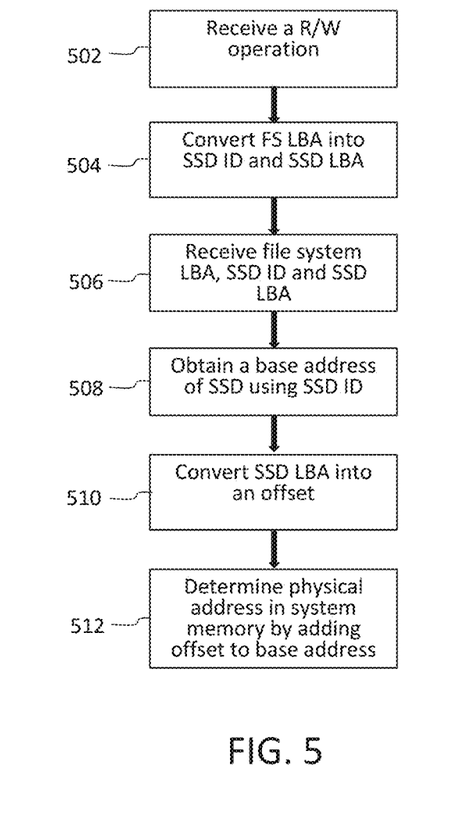
FIG. 5 is a flowchart illustrating a method of operating a CXL SSD-based RAID system with a RAID 0 array, according to an embodiment.

FIG. 5 is a flowchart illustrating a method of operating a CXL SSD-based RAID system with a RAID 0 array, according to an embodiment. At 502, a file system of the RAID system may receive a R/W operation from an application. At 504, a RAID module may receive an FS LBA corresponding to the R/W operation from the file system, and convert an FS LBA into an SSD ID in a RAID array and an SSD LBA. At 506, a memory mapping module may receive the file system LBA, the SSD ID, and the SSD LBA. At 508, the memory mapping module may obtain a base address of an SSD using the SSD ID. At 510, the memory mapping module may convert the SSD LBA into an offset. At 512, the memory mapping module may determine a physical address in the system memory by adding the offset to the base address. Accordingly, the memory mapping module may create a direct mapping from a virtual memory of the application to a RAID array in the system memory.

Figure 6:
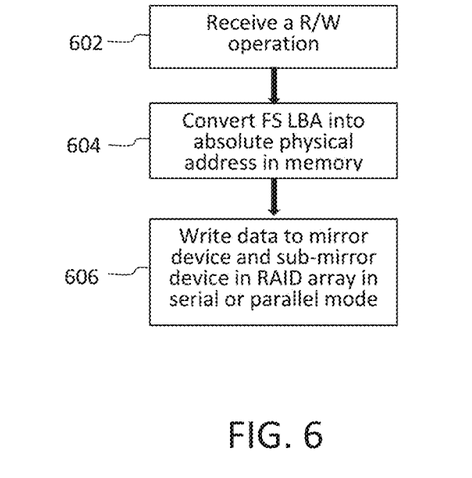
FIG. 6 is a flowchart illustrating a method of operating a CXL SSD-based RAID system with a RAID array, according to an embodiment.

FIG. 6 is a flowchart illustrating of operating a CXL SSD-based RAID system with a RAID array in a serial or parallel mode. The RAID array may be any standard RAID level above RAID 0 (e.g., RAID 1-6). At 602, a file system of the RAID system may receive a R/W operation from an application. At 604, a memory mapping module may receive an FS LBA corresponding to the R/W operation from the FS, and may convert an FS LBA into an absolute physical address in the system memory of the RAID system. The absolute physical address includes a base address of an SSD in a RAID array.

At 606, data may be written to a mirror storage device and a sub-mirror storage device in a RAID array in a serial mode or a parallel mode based on the absolute physical address. In the serial mode, the SSD corresponding to a mirror storage device or a sub-mirror storage device may be chosen in accordance with a RAID array distribution policy. Data may be written to the SSD, and replication may be performed by copying the data from the SSD to the other of the mirror storage device or the sub-mirror storage device. In the parallel mode, write protection may be set so that data is first written to a RAID mirror zone in a DRAM of the system memory, and data may be simultaneously written to a mirror storage device and a sub-mirror storage device in SSDs of the RAID array.

Figure 7:
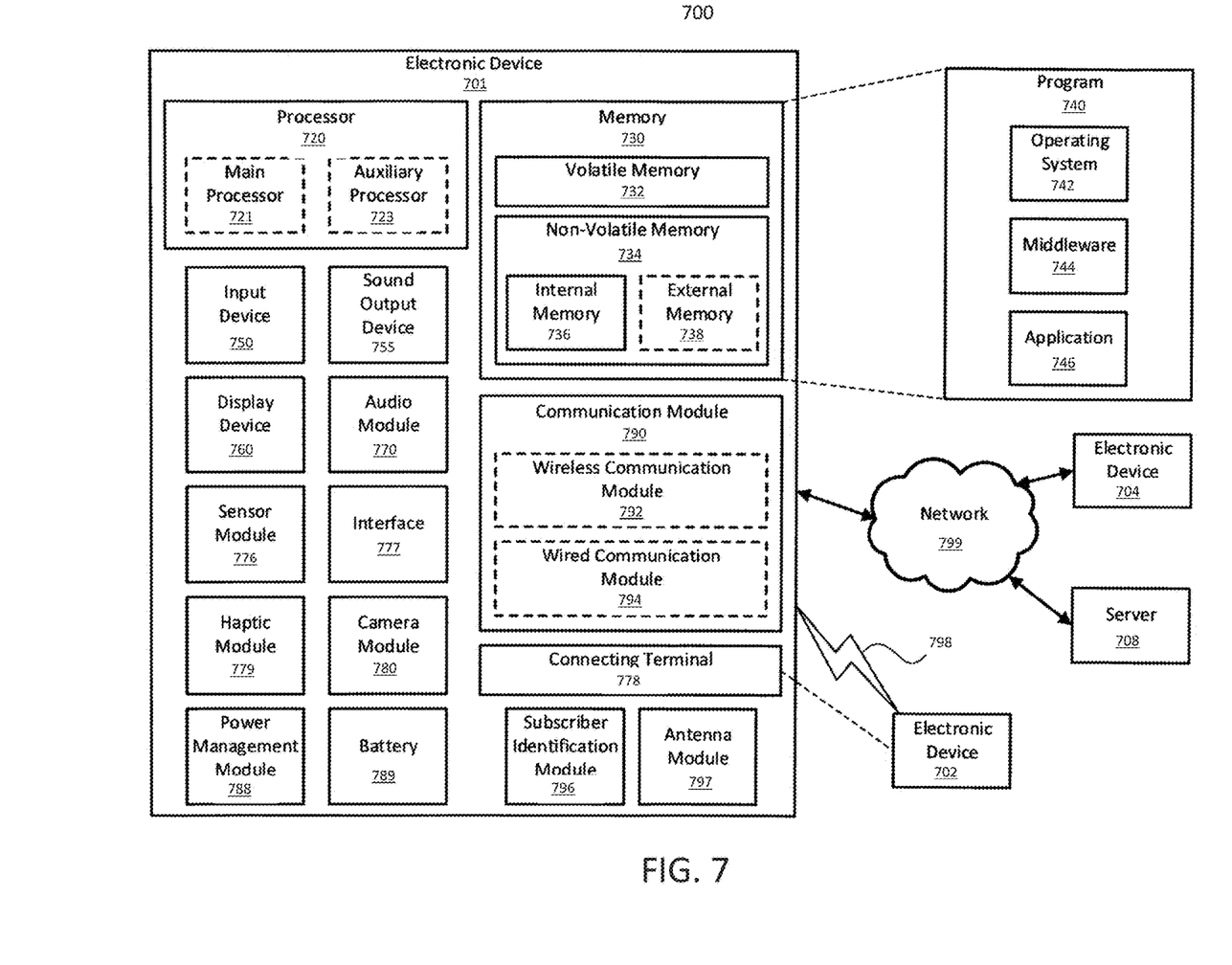
FIG. 7 illustrates a block diagram of an electronic device in a network environment, according to one embodiment.

FIG. 7 illustrates a block diagram of an electronic device 701 in a network environment 700, according to one embodiment. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. The processor may correspond to the HCPU, or a combination of the HCPU, embedded CPUs, and or neural CPUs of the SSD. As at least part of the data processing or computations, the processor 720 may load a command or data received from a host or another component (e.g., the sensor module 776 or the communication module 790) in volatile memory 732, process the command or the data stored in the volatile memory 732, and store resulting data in non-volatile memory 734. The processor 720 may include a main processor 721 (e.g., a CPU or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Additionally or alternatively, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 8:
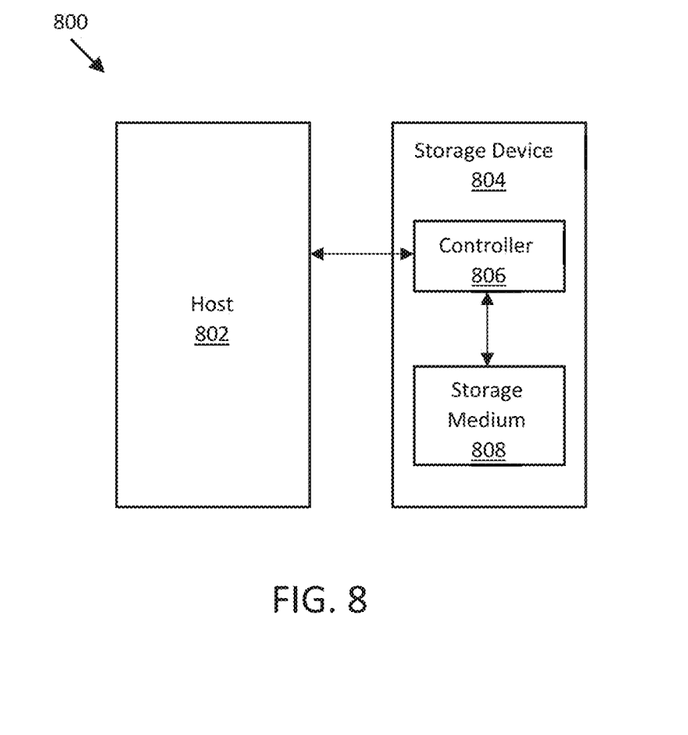
FIG. 8 illustrates a diagram of a storage system, according to an embodiment.

FIG. 8 illustrates a diagram of a storage system 800, according to an embodiment. The storage system 800 includes a host 802 and a storage device 804. Although one host and one storage device are depicted, the storage system 800 may include multiple hosts and/or multiple storage devices, such as a RAID array. The storage device 804 may be an SSD, a universal flash storage (UFS), etc. The storage device 804 includes a controller 806 and a storage medium 808 connected to the controller 806. The controller 806 may be an SSD controller, a UFS controller, etc. The storage medium 808 may include a volatile memory, a non-volatile memory, or both, and may include one or more flash memory chips (or other storage media). The controller 806 may include one or more processors, one or more error correction circuits, one or more field programmable gate arrays (FPGAs), one or more host interfaces, one or more flash bus interfaces, etc., or a combination thereof. The controller 806 may be configured to facilitate transfer of data/commands between the host 802 and the storage medium 808. The host 802 sends data/commands to the storage device 804 to be received by the controller 806 and processed in conjunction with the storage medium 808. As described herein, the methods, processes and algorithms may be implemented on a storage device controller, such as controller 806. Arbiters, command fetchers, and command processors may be implemented in the controller 806 of the storage device 804, and the processors and buffers may be implemented in the host 802.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a redundant array of independent disks (RAID) system, comprising:
   receiving an operation from an application at a file system (FS) of the RAID system;
   receiving, at a memory mapping module of the RAID system, at least an FS logical block address (LBA) from the FS, in accordance with the operation;
   creating, by the memory mapping module, a mapping from a virtual memory of the application to a RAID array in a system memory of the RAID system using at least the FS LBA,
   wherein, in case that the RAID array is a RAID level array of a first type, the mapping is created using storage device information from a RAID module of the RAID system.

2. The method of claim 1, wherein the RAID array comprises storage devices with a cache-coherent protocol.

3. The method of claim 2, wherein the RAID array is the RAID level array of the first type, and the method further comprising:
   converting, at the RAID module of the RAID system, the FS LBA into a storage device identifier (ID) in the RAID array and a storage device LBA; and
   receiving, at the memory mapping module, the storage device ID and the storage device LBA,
   wherein the mapping is created using the FS LBA, the storage device ID, and the storage device LBA.

4. The method of claim 3, wherein creating the mapping comprises:
   obtaining an address of a storage device in the RAID array using the storage device ID;
   converting the storage device LBA to an offset; and
   determining a physical address in the system memory by adding the offset to the address.

5. The method of claim 2, wherein, the RAID array is a RAID level array of a second type, and creating the mapping comprises:
   converting, by the memory mapping module, the FS LBA to a physical address in the system memory, wherein the physical address includes an address of an SSD in the RAID array.

6. The method of claim 5, wherein creating the mapping further comprises:

choosing, by the memory mapping module, the storage device corresponding to a first storage device or a second storage device in accordance with a RAID array distribution policy.

7. The method of claim 6, wherein the RAID system operates in a serial mode, and further comprising:
   writing data in the storage device of the RAID array; and
   performing replication in the RAID array by copying the data from the storage device to the first storage device or the second storage device.

8. The method of claim 7, further comprising:
   determining, by a data replication manager, that a page of the storage device of the RAID array is dirty due to an update;
   recording a page ID of the page that is dirty; and
   clearing a dirty bit of the page and replicating data of the page.

9. The method of claim 5, wherein the RAID array operates in a parallel mode, and creating the mapping further comprises:
   setting, by the memory mapping module, a write protection so that data is first written to a portion of a dynamic random access memory (DRAM) of the system memory.

10. The method of claim 9, further comprising:
    determining, by a data replication manager, that a page of the portion of the DRAM is dirty;
    writing the data of the page to a first storage device and the second storage device in the storage devices of the RAID array; and
    clearing a dirty bit of the page.

11. A redundant array of independent disks (RAID) system, comprising:
    a file system (FS) configured to receive an operation from an application;
    a memory mapping module configured to:
       receive at least an FS logical block address (LBA) from the FS in accordance with the operation; and
       create a mapping from a virtual memory of the application to a RAID array in a system memory of the RAID system using at least the FS LBA,
       wherein, in case that the RAID array is a RAID level array of a first type, the mapping is created using storage device information from a RAID module of the RAID system.

12. The RAID system of claim 11, wherein the RAID array comprises storage devices with a cache-coherent protocol.

13. The RAID system of claim 12, wherein the RAID array is the RAID level array of the first type, and further comprising:
    the RAID module configured to convert the FS LBA into a storage device identifier (ID) in the RAID array and a storage device LBA,
    wherein the memory mapping module is further configured to receive the storage device ID and the storage device LBA, and
    wherein the direct mapping is created using the FS LBA, the storage device ID, and the storage device LBA.

14. The RAID system of claim 13, wherein, in creating the mapping, the memory mapping module is further configured to:
    obtain an address of a storage device in the RAID array using the storage device ID;
    convert the storage device LBA to an offset; and
    determine a physical address in the system memory by adding the offset to the address.

15. The RAID system of claim 14, wherein the RAID array operates in a parallel mode, and in creating the mapping, the memory mapping module is further configured to:
    set a write protection so that data is first written to a portion of a dynamic random access memory (DRAM) of the system memory.

16. The RAID system of claim 15, further comprising a data replication manager configured to:
    determine that a page of the portion of the DRAM is dirty;
    write the data of the page to a first storage device and a second storage device of the storage devices of the RAID array; and
    clear a dirty bit of the page.

17. The RAID system of claim 12, wherein the RAID array is a RAID level array of a second type and, in creating the mapping, the memory mapping module is further configured to:
    convert the FS LBA to a physical address in the system memory, wherein the physical address includes an address of storage device in the RAID array; and
    choose the storage device corresponding to a first storage device or a second storage device in accordance with a RAID array distribution policy.

18. The RAID system of claim 17, wherein the RAID system operates in a serial mode, and further comprising a paging module configured to:
    write data in the storage device of the RAID array; and
    perform replication in the RAID array by copying the data from the storage device to the first storage device or the second storage device.

19. The RAID system of claim 18, further comprising a data replication manager configured to:
    determine that a page of the storage device of the RAID array is dirty due to an update;
    record a page ID of the page that is dirty; and
    clear a dirty bit of the page and replicate data of the page.

20. A memory mapping module of a redundant array of independent disks (RAID) system, the memory mapping module comprising:
    a memory; and
    a controller in communication with the memory and configured to:
       receive at least a file system (FS) logical block address (LBA) from an FS of the RAID system, in accordance with an operation received at the FS; and
       create a mapping from a virtual memory of the application to a RAID array in a system memory of the RAID system using at least the FS LBA, wherein the RAID array comprises storage devices with a cache-coherent protocol,
       wherein, in case that the RAID array is a RAID level array of a first type, the mapping is created using storage device information from a RAID module of the RAID system.

* * * * *